United States Patent
Wu et al.

(10) Patent No.: US 11,415,837 B2
(45) Date of Patent: Aug. 16, 2022

(54) DISPLAY PANEL AND MANUFACTURING METHOD THEREOF, AND DISPLAY DEVICE

(71) Applicants: BOE Technology Group Co., Ltd., Beijing (CN); Beijing BOE Optoelectronics Technology Co., Ltd., Beijing (CN)

(72) Inventors: Xiaojuan Wu, Beijing (CN); Li Ma, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 1078 days.

(21) Appl. No.: 16/068,119

(22) PCT Filed: Nov. 3, 2017

(86) PCT No.: PCT/CN2017/109393
§ 371 (c)(1),
(2) Date: Jul. 4, 2018

(87) PCT Pub. No.: WO2018/161625
PCT Pub. Date: Sep. 13, 2018

(65) Prior Publication Data
US 2021/0191171 A1    Jun. 24, 2021

(30) Foreign Application Priority Data
Mar. 9, 2017    (CN) .......................... 201710138781.4

(51) Int. Cl.
*G02F 1/1339*    (2006.01)
*G02F 1/1333*    (2006.01)
*C08F 2/48*    (2006.01)
*C08F 230/08*    (2006.01)

(52) U.S. Cl.
CPC .............. *G02F 1/1339* (2013.01); *C08F 2/48* (2013.01); *C08F 230/08* (2013.01); *G02F 1/133325* (2021.01); *G02F 2202/023* (2013.01)

(58) Field of Classification Search
CPC ...................................................... C08F 230/08
See application file for complete search history.

(56) References Cited

U.S. PATENT DOCUMENTS

| 2012/0115971 A1* | 5/2012 | Parrish | ................... B05D 5/005 |
| | | | 521/189 |
| 2013/0135800 A1* | 5/2013 | Yang | ..................... G02F 1/1339 |
| | | | 361/679.01 |

FOREIGN PATENT DOCUMENTS

| CN | 103980832 A | 8/2014 |
| CN | 105807509 A | 7/2016 |
| CN | 106336818 A | 1/2017 |
| CN | 106773362 A | 5/2017 |
| JP | 2007108203 A | 4/2007 |
| TW | 201326962 A | 7/2013 |

OTHER PUBLICATIONS

The blog post entitled "What are Superhydrophobic Surfaces" authored by Lauren and published at https://www.biolinscientific.com/blog/what-are-superhydrophobic-surfaces (Dec. 2019).*
International Search Report (including English translation)and Written Opinion mailed in PCT/CN2017/109393, dated Feb. 2, 2018.

* cited by examiner

*Primary Examiner* — Marc S Zimmer
(74) *Attorney, Agent, or Firm* — Fay Sharpe LLP

(57) ABSTRACT

The present disclosure relates to a display panel, a manufacturing method thereof and a display device, in the field of display technology. The display panel comprises a first substrate; a second substrate, opposite to the first substrate; and a sealant, between the first substrate and the second substrate; wherein a first super-hydrophobic layer is between the first substrate and the sealant; and the first super-hydrophobic layer is formed by a reaction between photo-polymerizable monomer and siloxane having a reactive double bond under light. The arrangement of the super-hydrophobic layer can effectively prevent moisture from entering the display panel. Thus, the waterproof performance of the display panel is improved and the display panel can still function normally when it is in a high temperature and high humidity environment for a long time.

16 Claims, 2 Drawing Sheets

DISPLAY PANEL AND MANUFACTURING METHOD THEREOF, AND DISPLAY DEVICE

This application is a 371 of PCT Patent Application Serial No. PCT/CN2017/109393 filed Nov. 3, 2017, which claims priority to Chinese Patent Application No. 201710138781.4, filed with the State Intellectual Property Office on Mar. 9, 2017 and titled "DISPLAY PANEL AND MANUFACTURING METHOD THEREOF, AND DISPLAY DEVICE," the entire contents of which are incorporated herein by reference.

TECHNICAL FIELD

The present disclosure relates to the field of display technology, and more particular to a display panel and a manufacturing method thereof, and a display device.

BACKGROUND

With the rapid development of display technology, liquid crystal displays have been widely used due to their advantages such as light, thin, and good display effect.

The liquid crystal display panel is an important component of the liquid crystal display, and the performance of the liquid crystal display panel may affect the performance of the liquid crystal display. The liquid crystal display panel includes two substrates adhered by means of a sealant. The surfaces of the substrates are glass, and the sealant is in direct contact with the surfaces of the substrates. When manufacturing a liquid crystal display panel, a sealant is coated directly onto a sealant coating area on the surface of one of the substrates, liquid crystal is dropped on the surface of another of the substrates, and then the two substrates are laminated and subjected to ultraviolet curing and heat curing to cure the sealant, thereby obtaining a liquid crystal display panel.

In the process of implementing the present disclosure, there are at least the following problems in the related art: the water vapor and oxygen barrier property of the existing liquid crystal display panels remain to be improved.

SUMMARY

In one aspect, embodiments of the present disclosure provide a display panel in the present disclosure. The display panel comprises a first substrate; a second substrate, opposite to the first substrate; and a sealant, between the first substrate and the second substrate; wherein a first waterproof layer is between the first substrate and the sealant; and the first waterproof layer is formed by a reaction between photopolymerizable monomer and siloxane under light.

In some embodiments, the siloxane is siloxane having a carbon-carbon double bond.

In some embodiments, the siloxane has a molecular structure shown in Formula (I):

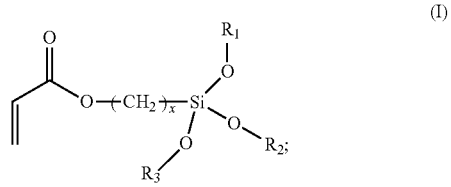

wherein $x \geq 1$, $R_1$, $R_2$ and $R_3$ are alkyl groups

In some embodiments, x is an integer from 1 to 20, and $R_1$, $R_2$, and $R_3$ are alkyl groups having 20 or less carbon atoms.

In some embodiments, the siloxane has a molecular structure shown in Formula (II):

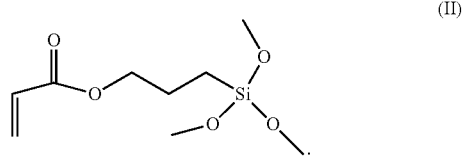

In some embodiments, wherein the photopolymerizable monomer has a molecular structure shown in Formula (III):

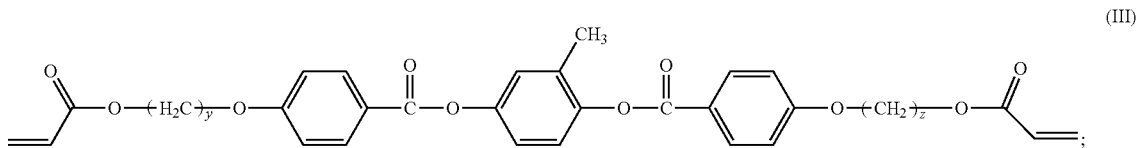

wherein $y \geq 1$ and $z \geq 1$.

In some embodiments, y is an integer from 1 to 20, and z is an integer from 1 to 20.

In some embodiments, the photopolymerizable monomer has a molecular structure shown in Formula (IV):

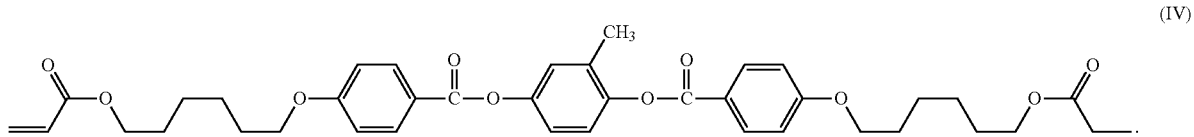 [SMILES: C=CC(=O)OCCCCCCOc1ccc(C(=O)Oc2ccc(OC(=O)c3ccc(OCCCCCCOC(=O)CC)cc3)c(C)c2)cc1]

In some embodiments, a second waterproof layer is between the second substrate and the sealant.

In another aspect, there is provided a method for manufacturing a display panel, comprising: forming a solution of the siloxane onto a sealant coating area of a first substrate, and heating the first substrate to remove solvent in the solution of the siloxane; coating a mixture of the photopolymerizable monomer and the sealant onto the sealant coating area of the first substrate; and assembling the first substrate coated with the mixture of the photopolymerizable monomer and the sealant and the second substrate onto which liquid crystal is dropped, and curing the sealant by lighting and heating to obtain the display panel.

In some embodiments, the siloxane is siloxane having a carbon-carbon double bond.

In some embodiments, the siloxane has a molecular structure shown in Formula (I):

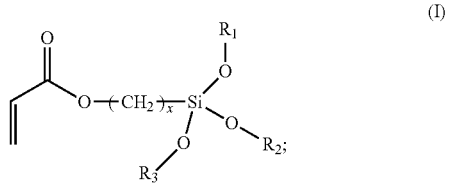

(I)

wherein x≥1, $R_1$, $R_2$, and $R_3$ are alkyl groups.

In some embodiments, x is an integer from 1 to 20, and $R_1$, $R_2$, and $R_3$ are alkyl groups having 20 or less carbon atoms.

In some embodiments, the siloxane has a molecular structure shown in Formula (II):

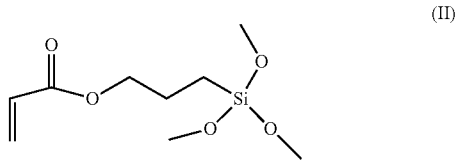

(II)

In some embodiments, the mass percentage of the siloxane is from 1% to 5% in the solution of the siloxane.

In some embodiments, the photopolymerizable monomer has a molecular structure shown in Formula (III):

In some embodiments, the mass percentage of the photopolymerizable monomer is from 3% to 10% in the mixture of the photopolymerizable monomer and the sealant.

In some embodiments, heating the first substrate to remove the solvent in the solution of the siloxane comprises: heating the first substrate at 80° C. to 120° C. for 0.5 to 2 hours.

In some embodiments, the method for preparing the mixture of the photopolymerizable monomer and the sealant comprises: uniformly mixing the photopolymerizable monomer and the sealant, and defoaming under darkness.

In another aspect, there is provided a display device, comprising a display panel. The display panel comprises a first substrate; a second substrate, opposite to the first substrate; and a sealant, between the first substrate and the second substrate; wherein a first waterproof layer is between the first substrate and the sealant; and the first waterproof layer is formed by a reaction between photopolymerizable monomer and siloxane under light.

BRIEF DESCRIPTION OF THE DRAWINGS

To describe the technical solutions in the embodiments of the present disclosure more clearly, the following briefly introduces the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DETAILED DESCRIPTION

Embodiments of the present disclosure will be described in further detail with reference to the enclosed drawings, to clearly present the technique solutions and advantages of the present disclosure. All of the technical terms used in the

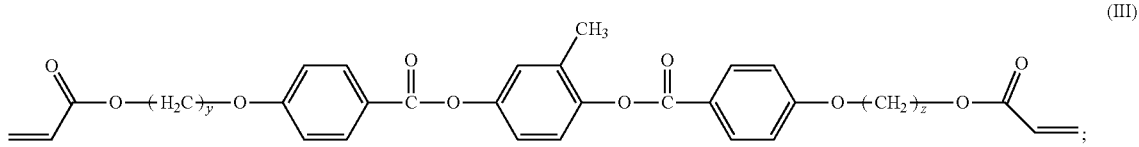

(III)

wherein y≥1 and z≥1

In some embodiments, y is an integer from 1 to 20, and z is an integer from 1 to 20.

In some embodiments, the photopolymerizable monomer has a molecular structure shown in Formula (IV):

embodiments of the present disclosure have the same meanings as those commonly understood by those of ordinary skill in the art, unless otherwise indicated.

Figure 1:
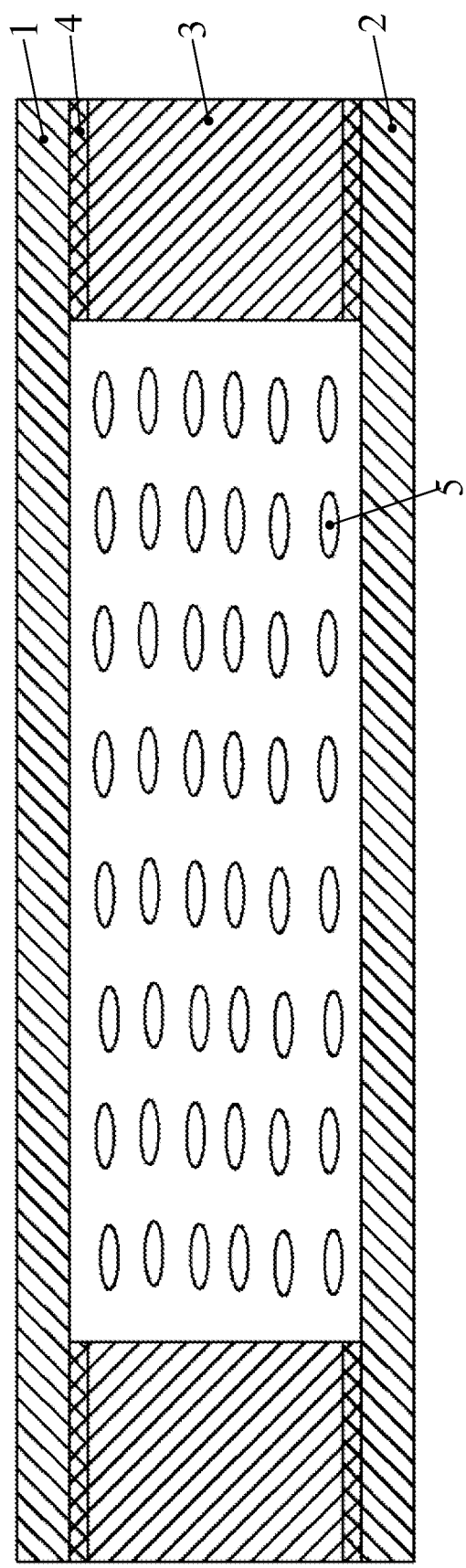
FIG. 1 is a structural schematic diagram of a display panel provided in an embodiment of the present disclosure.

In a first aspect, an embodiment of the present disclosure provides a display panel. Referring to FIG. 1, which is a

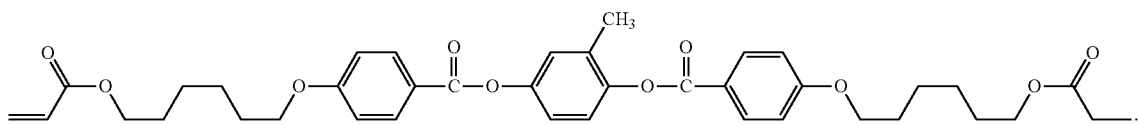

(IV)

schematic structural diagram of the display panel according to an embodiment of the present disclosure, the display panel includes a first substrate 1, a second substrate 2, opposite to the first substrate 1; and a sealant 3, between the first substrate 1 and the second substrate 2. A first waterproof layer 4 is provided between the first substrate 1 and the sealant 3. The first waterproof layer 4 is formed by a reaction between siloxane and photopolymerizable monomer under light.

The surfaces of the first substrate 1 and the second substrate 2 of the display panel are hydrophilic glass, and moisture in the environment may easily penetrate the substrates and enter the display panel. In addition, the sealant 3 for adhering the first substrate 1 and the second substrate 2 is a high molecular polymer and has waterproofness. Thus, the sealant 3 cannot be well attached to the first substrate 1 and to the second substrate 2, and there may be gaps therebetween, which easily leads to the entrance of moisture, thereby causing problems such as abnormal display of the display panel.

the existing liquid crystal display panels have poor waterproof performance in a high temperature and high humidity environment. When the liquid crystal display panel is in a high temperature and high humidity environment for a long time, moisture in the environment will easily penetrate the substrates and enter the liquid crystal display panel, thereby causing problems such as abnormal display, which affect the performance of the liquid crystal display.

Based on the above, in the display panel provided in the embodiment of the present disclosure, the waterproof layer 4 is provided between the first substrate 1 and the sealant 3, and the waterproof layer 4 is formed by a reaction between photopolymerizable monomer and siloxane. The siloxane refers to a compound having a siloxane group and a reactive double bond in its molecular structure, and the photopolymerizable monomer refers to a compound having two or more groups in its molecular structure which may further react under light. The oxygen atoms in the siloxane molecule can form a strong hydrogen bonding with glass, so that the waterproof layer 4 formed can have good waterproof performance and can also be tightly bonded with the first substrate 1, thereby effectively preventing moisture from penetrating the substrates and entering the display panel. Thus, the display panel still has good waterproof performance when it is in a high temperature and high humidity environment for a long time, thereby avoiding failure due to the entrance of water. Furthermore, in the display panel provided in the embodiment of the present disclosure, the waterproof layer 4 has good compatibility with the waterproof sealant 3, and can also be bonded tightly to the surfaces of the substrates, thereby improving the adhesive performance between the sealant and the substrates, which in turn helps to improve the service performance of the display panel in a high temperature and high humidity environment.

In the embodiment of the present disclosure, "a first waterproof layer 4 is provided between the first substrate 1 and the sealant 3," means that the waterproof layer 4 above may be merely provided between the first substrate 1 and the sealant 3 or merely between the second substrate 2 and the sealant 3, or the waterproof layer 4 may be provided between the first substrate 1 and the sealant 3 and between the second substrate 2 and the sealant 3. In some embodiments, a second waterproof layer 4 is between the second substrate 2 and the sealant 3.

The specific chemical structures of the photopolymerizable monomer and the siloxane for forming the first waterproof layer 4 between the first substrate 1 and the sealant 3 may be the same as or different from the specific chemical structures of the photopolymerizable monomer and the siloxane for forming the second waterproof layer 4 between the second substrate 2 and the sealant 3.

It will be understood by those skilled in the art that one of the first substrate 1 and the second substrate 2 is an array substrate and the other is a color filter substrate.

Further, in the embodiment of the present disclosure, the reactive double bond may be a carbon-carbon double bond or a carbon-oxygen double bond. In addition, the siloxane molecule may have only one reactive double bond, or may have two, three, or more reactive double bonds.

The siloxane may be a compound having a molecular structure shown in Formula (I):

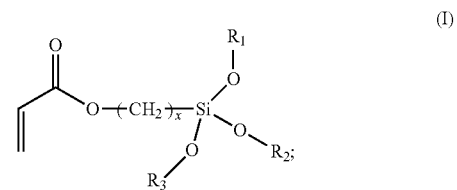

wherein x≥1, and $R_1$, $R_2$, and $R_3$ are alkyl groups.

In the molecular structure, the carbon-carbon double bond at the end of the molecular chain is a reactive double bond.

The value of x and the selection of the type of R1, R2, and R3 alkyl groups will have an effect on the bonding ability of the siloxane with the surfaces of the substrates, the reactivity of the siloxane with the photopolymerizable monomer, and the performance of the waterproof layer 4 finally formed. From the above considerations, the value of x may be an integer from 1 to 20, which may specifically be 1, 2, 3, 4, 5, 6, 7, 8, 9, 10, 11, 12, 13, 14, 15, 16, 17, 18, 19 and 20. $R_1$, $R_2$, and $R_3$ may be selected from alkyl groups having 20 or less carbon atoms, which may be straight chain alkyl groups, or may be branched alkyl groups, such as methyl, ethyl, n-propyl, isopropyl, n-butyl, isobutyl, n-pentyl, isoamyl, neopentyl, dodecyl, hexadecyl, octadecyl, etc., and $R_1$, $R_2$, and $R_3$ may be the same or different.

In the embodiment of the present disclosure, the siloxane may be a compound having a molecular structure shown in Formula (II):

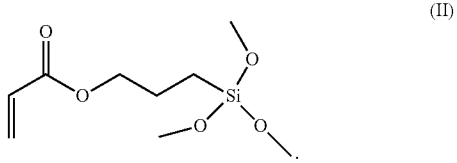

Further, in the embodiment of the present disclosure, the photopolymerizable monomer may be a compound having a molecular structure as shown in Formula (III):

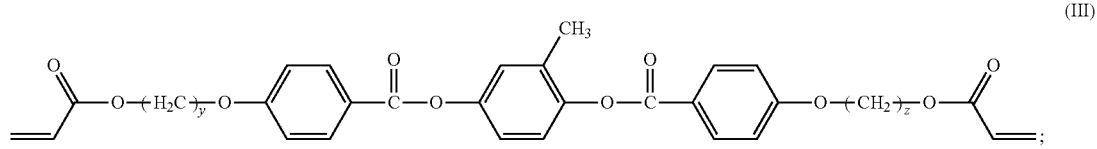

(III)

wherein $y \geq 1$ and $z \geq 1$.

From the viewpoints of the waterproofness, the reactivity with the siloxane with a reactive double bond, etc., the value of y may be an integer from 1 to 20, which may specifically be 1, 2, 3, 4, 5, 6, 7, 8, 9, 10, 11, 12, 13, 14, 15, 16, 17, 18, 19 and 20, and the value of z may be an integer from 1 to 20, which may specifically be 1, 2, 3, 4, 5, 6, 7, 8, 9, 10, 11, 12, 13, 14, 15, 16, 17, 18, 19 and 20. The values of y and z may be the same or different.

In the embodiment of the present disclosure, the photopolymerizable monomer may be a compound having a molecular structure shown in Formula (IV):

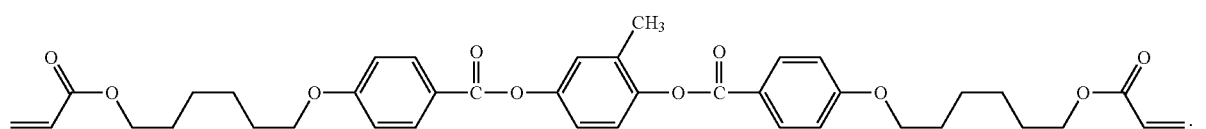

(IV)

In the embodiment of the present disclosure, the waterproof layer 4 is waterproof polysiloxane. and the thickness of the waterproof layer 4 is not strictly limited, and those skilled in the art can design according to the actual conditions.

Figure 2:
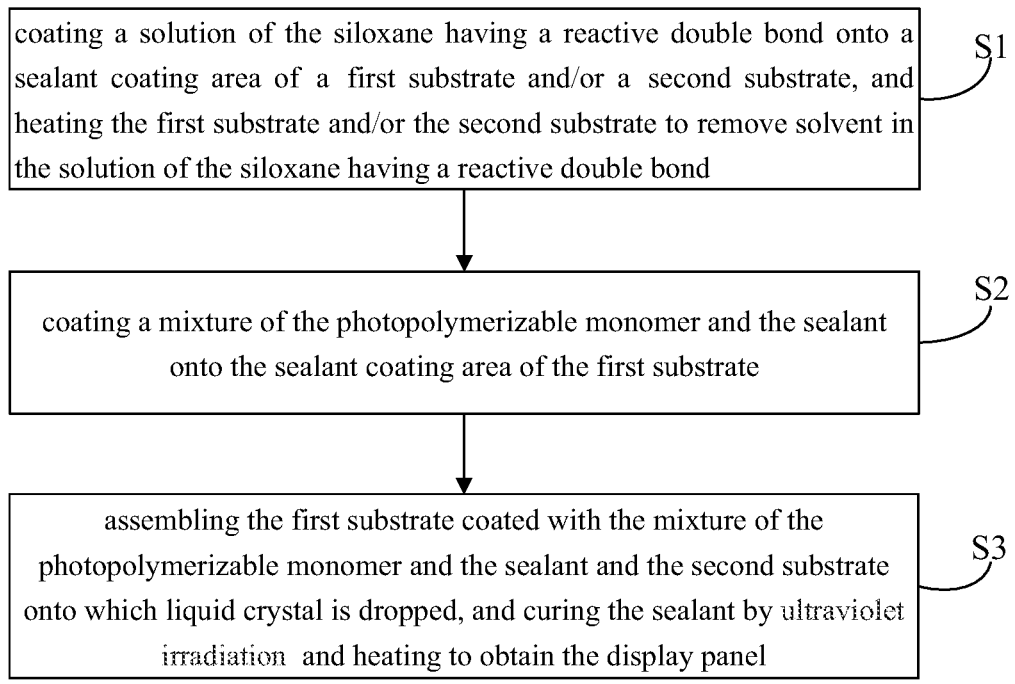
FIG. 2 is a flow chart of a method for manufacturing a display panel provided in an embodiment of the present disclosure.
Figure 3:
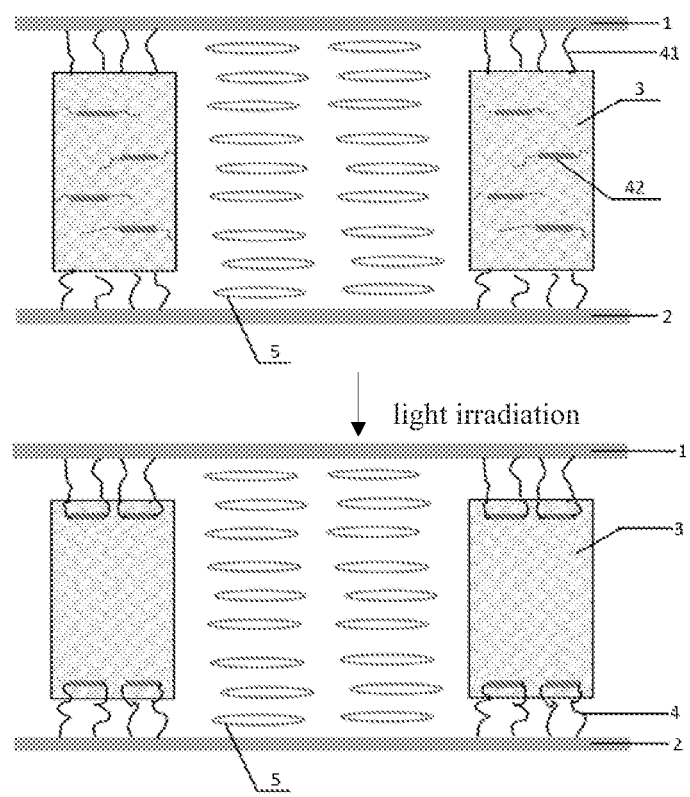
FIG. 3 is a schematic diagram of a principle of a method for manufacturing a display panel provided in an embodiment of the present disclosure.

In a second aspect, an embodiment of the present disclosure provides a method for manufacturing a display panel. Referring to FIG. 2, which is a flow chart of the method for manufacturing a display panel according to an embodiment of the present disclosure, and in combination with FIG. 3, which is a schematic diagram of the principle of the method for manufacturing a display panel according to an embodiment of the present disclosure, the manufacturing method includes the following steps.

In step S1: forming (e.g. coating) a solution of the siloxane 41 onto a sealant coating area of a first substrate 1, and heating the first substrate 1 to remove the solvent in the solution of the siloxane.

In step S2: coating a mixture of the photopolymerizable monomer 42 and the sealant 3 onto the sealant coating area of the first substrate 1.

In step S3: assembling the first substrate 1 coated with the mixture of the photopolymerizable monomer and the sealant and the second substrate 2 onto which liquid crystal 5 is dropped, and curing the sealant by lighting and heating to obtain the display panel.

In the manufacturing method provided in the embodiment of the present disclosure, the solution of the siloxane 41 is first coated onto the sealant coating area of the first substrate 1 and the first substrate 1 is heated to remove the solvent. In the course of removing the solvent by heating, the siloxane 41 forms a strong hydrogen bonding with the glass surfaces of the substrates, thereby grafting the siloxane 41 onto the surfaces of the substrates. Thereafter, the mixture of the photopolymerizable monomer 42 and the sealant 3 is coated onto the sealant coating area of the first substrate 1, and the first substrate 1 and the second substrate onto which liquid crystal 5 is dropped are assembled and the sealant 3 is cured by lighting and heating. In the course of lighting, the double bond in the molecule of the siloxane 41 reacts with the photopolymerizable monomer 42, and the waterproof layer 4 is formed between the first substrate 1 and the sealant 3 and between the second substrate 2 and the sealant 3. Thus, moisture is prevented from penetrating the substrates and entering the display panel, so that the display panel still has good waterproof performance when it is in a high temperature and high humidity environment for a long time, thereby avoiding failure due to the entrance of water. Furthermore, in the display panel manufactured in the embodiment of the present disclosure, the adhesive performance between the sealant 3 and the substrates is also improved, and the service performance of the display panel in the high temperature and high humidity environment is further improved.

In the embodiment of the present disclosure, the method for coating the sealant and the method for dropping the liquid crystal are not particularly limited, and the conventional technical means in the art can be used. Generally, the edge area of the surface of the substrate is the sealant coating area, and the area in the center of the surface of the substrate enclosed by the sealant coating area is the liquid crystal dropping area.

In the embodiment of the present disclosure, the specific compositions of the sealant are also not particularly limited, and the sealant commonly used in the art may be used. It ill be understood by those skilled in the art that the compositions of the sealant include, but are not limited to, photo polymerizable monomer, thermal polymerizable monomer, photoinitiator, thermal curing agents, and granular additives. The photoinitiator initiates the polymerization reaction of the photopolymerizable monomer in the sealant and also initiates the reaction between the siloxane and the photopolymerizable monomer. The lighting conditions and heating conditions during the curing of the sealant are also not particularly limited in the embodiment of the present disclosure as long as they can ensure that the sealant is fully cured, and they can be determined according to the specific compositions of the sealant.

In the embodiment of the present disclosure, the light for curing the sealant 3 may be ultraviolet light, and light with other wavelengths may also be selected according to actual needs.

Further, in the embodiment of the present disclosure, the reactive double bond may be a carbon-carbon double bond or a carbon-oxygen double bond. In addition, the siloxane molecule may have only one reactive double bond, or may have two, three, or more reactive double bonds.

The siloxane may be a compound having a molecular structure shown in Formula (I):

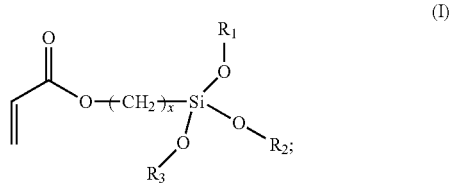

(I)

wherein x≥1, $R_1$, $R_2$, and $R_3$ are alkyl groups.

In the molecular structure, the carbon-carbon double bond at the end of the molecular chain is the reactive double bond.

From the viewpoints of the bonding ability with the surfaces of the substrates, the reactivity with the photopolymerizable monomer, and the performance of the waterproof layer finally formed, the value of x may be an integer from 1 to 20, which may specifically be 1, 2, 3, 4, 5, 6, 7, 8, 9, 10, 11, 12, 13, 14, 15, 16, 17, 18, 19 and 20, and $R_1$, $R_2$, and $R_3$ may be alkyl groups having 20 or less carbon atoms, which may be straight chain alkyl groups, or may be branched alkyl groups, such as methyl, ethyl, n-propyl, isopropyl, n-butyl, isobutyl, n-pentyl, isoamyl, neopentyl, dodecyl, hexadecyl, octadecyl, etc., and $R_1$, $R_2$ and $R_3$ may be the same or different.

In the embodiment of the present disclosure, the siloxane may be a compound having a molecular structure shown in Formula (II):

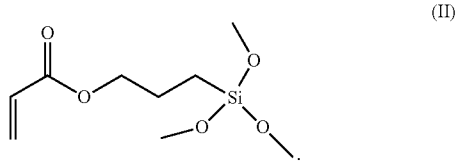

(II)

In the embodiment of the present disclosure, in the solution of the siloxane, the mass percentage of the siloxane may be from 1% to 5%, for example, 1%, 1.5%, 2%, 2.5%, 3%, 3.5%, 4%, 4.5%, 5%, etc. The solvent in the solution of the siloxane may be any solvent commonly used in the art as long as it can sufficiently dissolve the siloxane. For example, the solvent may be water, ethanol, methanol, acetone and the like.

Further, in the embodiment of the present disclosure, the photopolymerizable monomer may be a compound having a molecular structure shown in Formula (III):

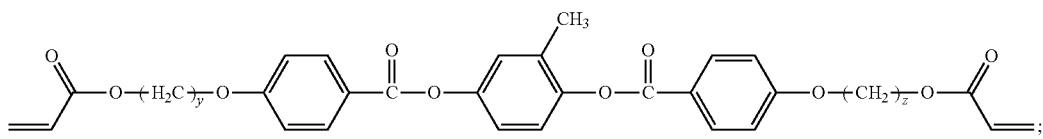

(III)

wherein y≥1 and z≥1.

From the viewpoints of the waterproofness, the reactivity with the siloxane, etc., the value of y may be an integer from 1 to 20, which may specifically be 1, 2, 3, 4, 5, 6, 7, 8, 9, 10, 11, 12, 13, 14, 15, 16, 17, 18, 19 and 20, and the value of z may be an integer from 1 to 20, which may specifically be 1, 2, 3, 4, 5, 6, 7, 8, 9, 10, 11, 12, 13, 14, 15, 16, 17, 18, 19 and 20, and the values of y and z may be the same or different.

In the embodiment of the present disclosure, the photopolymerizable monomer may be a compound having a molecular structure shown in Formula (IV):

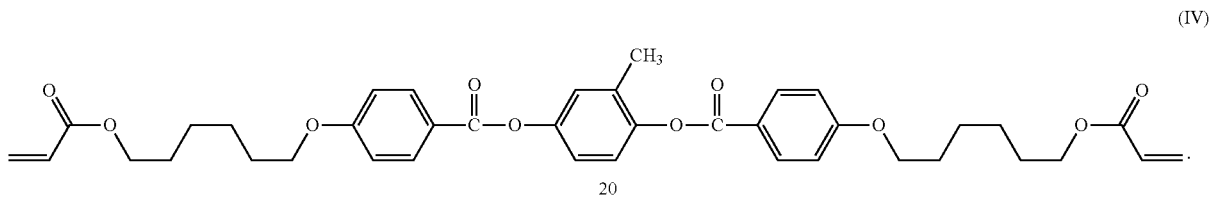

(IV)

In the embodiment of the present disclosure, the mass percentage of the photopolymerizable monomer in the mixture of the photopolymerizable monomer and the sealant may be from 3% to 10%, for example, 3%, 3.5%, 4%, 4.5%, 5%, 5.5%, 6%, 6.5%, 7%, 7.5%, 8%, 8.5%, 9%, 9.5%, 10%, etc.

Further, in the embodiment of the present disclosure, the specific condition for heating the first substrate and/or the second substrate to remove the solvent in the solution of the siloxane may be determined according to the type of the solvent used, so that the solvent can be sufficiently removed and the siloxane is firmly bonded to the substrates. For example, the first substrate and/or the second substrate may be heated at 80° C.~120° C. (e.g., 80° C., 85° C., 90° C., 95° C., 100° C., 105° C., 110° C., 115° C., 120° C., etc.) for 0.5~2 hours (e.g., 0.5, 1, 1.5, 2 hours, etc.).

Further, in the embodiment of the present disclosure, the method for preparing the mixture of the photopolymerizable monomer and the sealant may include: uniformly mixing the photopolymerization monomer and the sealant, and defoaming under darkness. The specific condition for defoaming is not particularly limited in the embodiment of the present disclosure, and conventional technical means in the art can be used. For example, the mixture of the photopolymerizable monomer and the sealant may be placed in a defoamer for defoaming.

In a third aspect, an embodiment of the present disclosure provides a display device including a display panel. The display panel includes a first substrate 1; a second substrate 2, opposite to the first substrate 1; and a sealant 3, between the first substrate 1 and the second substrate 2; wherein a first waterproof layer 4 is between the first substrate 1 and the sealant 3; and the first waterproof layer 4 is formed by a reaction between photopolymerizable monomer and siloxane under light.

From the above, since the above-mentioned display panel still has good waterproof performance when it is in a high temperature and high humidity environment for a long time, the workability of the display device with the display panel in a high temperature and high humidity environment is improved.

In the embodiment of the present disclosure, the display device may be any product or component having a display function such as an electronic paper, an OLED panel, a mobile phone, a tablet computer, a television, a display, a notebook computer, a digital photo frame, a navigator, and the like.

The technical method in the embodiments of the present disclosure is further described in detail hereafter through specific experimental data.

In the following specific embodiments, the operations involved which do not specify the conditions are performed according to the conventional conditions or the conditions recommended by the manufacturer. The raw materials used which do not specify a manufacturer and specifications are conventional products that are available in the market.

An Embodiment of the Disclosure

This embodiment (embodiment A) provides a display panel and a manufacturing method thereof. The manufacturing method specifically includes following steps.

In step 101, the siloxane and having a structure shown in Formula (II) is dissolved in distilled water to obtain an aqueous solution of the siloxane, wherein the mass percentage of the siloxane is 2%.

In step 102, the aqueous solution of the siloxane obtained in step 101 is coated onto the sealant coating areas of the first substrate and the second substrate, and then the first substrate and the second substrate are heated at 100° C. for 1 hour.

In step 103, the sealant SWB-73 (available from Sekisui Chemical Co., Ltd.) and the photopolymerizable monomer having a structure shown in Formula (IV) are uniformly mixed in a mass ratio of 95:5 and are placed in a defoamer for defoaming under darkness to obtain the mixture of the sealant and the photopolymerizable monomer. The defoaming lasts for 2 hours.

In step 104, the mixture of the sealant and the photopolymerizable monomer obtained in step 103 is uniformly coated onto the sealant coating area of the first substrate under darkness.

In step 105, liquid crystal is dropped onto the liquid crystal dropping area of the second substrate.

In step 106, the first substrate coated with the mixture of the sealant and the photopolymerizable monomer in step 104 and the second substrate onto which liquid crystal is dropped in step 105 are assembled and then are subjected to ultraviolet irradiation to cure the sealant. During this process, the siloxane and the photopolymerizable monomer react so that a waterproof layer is formed between the first substrate and the sealant and between the second substrate and the sealant. Thereafter, thermal curing is performed to completely cure the sealant to obtain the display panel.

The display panel obtained in this embodiment is tested for reliability under high temperature and high humidity conditions, and the specific test conditions are as follows: five display panel samples are manufactured according to the manufacturing method of this embodiment, and the display panel samples obtained are placed in an environment with a temperature of 60° C. and a relative humidity of 90% for 72 hours.

The test result shows that all of the five display panel samples may function normally, and do not suffer from the problem of moisture entering the display panel, and do not suffer from the problem of non-uniform and poor display on the circumference of the display panel due to the entrance of moisture.

An Embodiment of the Disclosure

This embodiment (embodiment B) provides a display panel and a manufacturing method thereof. The manufacturing method specifically includes following steps.

In step 201, the siloxane and having a structure shown in Formula (II) is dissolved in distilled water to obtain an aqueous solution of the siloxane, wherein the mass percentage of the siloxane is 3%.

In step 202, the aqueous solution of the siloxane obtained in step 201 is coated onto the sealant coating areas of the first substrate and the second substrate, and then the first substrate and the second substrate are heated at 100° C. for 1.5 hours.

In step 203, the sealant SUR-66 (available from Sekisui Chemical Co., Ltd.) and the photopolymerizable monomer having a structure as shown in Formula (IV) are uniformly mixed in a mass ratio of 97:3 and are placed in a defoamer for defoaming under darkness to obtain the mixture of the sealant and the photopolymerizable monomer. The defoaming lasts for 2.5 hours.

In step 204, the mixture of the sealant and the photopolymerizable monomer obtained in step 203 is uniformly coated onto the sealant coating area of the first substrate under darkness.

In step 205, liquid crystal is dropped onto the liquid crystal dropping area of the second substrate.

In step 206, the first substrate coated with the mixture of the sealant and the photopolymerizable monomer in step 204 and the second substrate onto which liquid crystal is dropped in step 205 are assembled and then are subjected to ultraviolet irradiation to cure the sealant. During this process, the siloxane and the photopolymerizable monomer react so that a waterproof layer is formed between the first substrate and the sealant and between the second substrate and the sealant. Thereafter, thermal curing is performed to completely cure the sealant to obtain the display panel.

According to the test method of Embodiment A, the display panel obtained in this embodiment is tested for reliability under high temperature and high humidity. The test result shows that all of the five display panel samples may function normally, and do not suffer from the problem of moisture entering the display panel, and do not suffer from the problem of non-uniform and poor display on the circumference of the display panel due to the entrance of moisture.

An Embodiment of the Disclosure

This embodiment provides a display panel and a manufacturing method thereof, and this manufacturing method differs from the method of Embodiment A in the followings:

the mass percentage of the siloxane is 1%;

after the aqueous solution of the siloxane is coated onto the sealant coating areas of the first substrate and the second substrate, the first substrate and the second substrate are heated at 100° C. for 2 hours; and in the mixture of the sealant and the photopolymerizable monomer, the mass ratio of the sealant and the photopolymerizable monomer is 97:3.

According to the test method of Embodiment A, the display panel obtained in this embodiment is tested for reliability under high temperature and high humidity, and the test result is the same as that of Embodiment A.

An Embodiment of the Disclosure

This embodiment provides a display panel and a manufacturing method thereof, and this manufacturing method differs from the method of Embodiment A in the followings:

the mass percentage of the siloxane is 5%:

after the aqueous solution of the siloxane is coated onto the sealant coating areas of the first substrate and the second substrate, the first substrate and the second substrate are heated at 100° C. for 0.5 hour, and in the mixture of the sealant and the photopolymerizable monomer, the mass ratio of the sealant and the photopolymerizable monomer is 90:10.

According to the test method of Embodiment A, the display panel obtained in this embodiment is tested for reliability under high temperature and high humidity, and the test result is the same as that of Embodiment A.

An Embodiment of the Disclosure

This embodiment provides a display panel and a manufacturing method thereof, and this manufacturing method differs from the method of Embodiment B in the followings:

the mass percentage of the siloxane is 1%:

after the aqueous solution of the siloxane is coated onto the sealant coating areas of the first substrate and the second substrate, the first substrate and the second substrate are heated at 100° C. for 2 hours; and in the mixture of the sealant and the photopolymerizable monomer, the mass ratio of the sealant and the photopolymerizable monomer is 94:6.

According to the test method of Embodiment A, the display panel obtained in this embodiment is tested for reliability under high temperature and high humidity, and the test result is the same as that of Embodiment B.

An Embodiment of the Disclosure

This embodiment provides a display panel and a manufacturing method thereof, and this manufacturing method differs from the method of Embodiment B in the followings:

the mass percentage of the siloxane is 5%;

after the aqueous solution of the siloxane is coated onto the sealant coating areas of the first substrate and the second substrate, the first substrate and the second substrate are heated at 100° C. for 1 hour; and in the mixture of the sealant and the photopolymerizable monomer, the mass ratio of the sealant and the photopolymerizable monomer is 90:10.

According to the test method of Embodiment A, the display panel obtained in this embodiment is tested for reliability under high temperature and high humidity, and the test result is the same as that of Embodiment B.

Comparative Embodiment

This comparative embodiment provides an existing display panel and a manufacturing method thereof. This manufacturing method specifically includes followings steps.

In step 701, a sealant SWB-73 (available from Sekisui Chemical Co., Ltd.) is placed in a defoamer for defoaming under darkness, and the defoaming lasts for 2 hours.

In step 702, the sealant obtained in step 701 is uniformly coated onto the sealant coating area of the first substrate under darkness.

In step 703, liquid crystal is dropped onto the liquid crystal dropping area of the second substrate.

In step 704, the first substrate coated with the sealant in step 702 and the second substrate onto which liquid crystal is dropped in step 703 are assembled and then are subjected to ultraviolet irradiation and heating in sequence to cure the sealant completely to obtain the display panel.

According to the test method of Embodiment A, the display panel obtained in this comparative embodiment is tested for reliability under high temperature and high humidity, and the test result shows that one of the five display panel samples suffers from the problem of non-uniform and poor display on the circumference of the display panel due to moisture entering the display panel.

Comparative Embodiment

This comparative embodiment provides an existing display panel and a manufacturing method thereof. This manufacturing method specifically includes following steps.

In step 801, a sealant SUR-66 (available from Sekisui Chemical Co., Ltd.) is placed in a defoamer for defoaming under darkness, and the defoaming lasts for 2.5 hours.

In step 802, the sealant obtained in step 801 is uniformly coated onto the sealant coating area of the first substrate under darkness.

In step 803, liquid crystal is dropped onto the liquid crystal dropping area of the second substrate.

In step 804, the first substrate coated with the sealant in step 802 and the second substrate onto which liquid crystal is dropped in step 803 are assembled and then are subjected to ultraviolet irradiation and heating in sequence to cure the sealant completely to obtain the display panel.

According to the test method of Embodiment A, the display panel obtained in this comparative embodiment is tested for reliability under high temperature and high humidity, and the test result shows that one of the five display panel samples suffers from the problem of non-uniform and poor display on the circumference of the display panel due to moisture entering the display panel.

By performing a test on the display panel in the above embodiments and the comparative embodiments for reliability under high temperature and high humidity, it can be seen from the test results that the moisture can be effectively prevented from entering the display panel by providing a waterproof layer between the substrates of the display panel and the sealant. Thus, the waterproof performance of the display panel is improved, and the display panel can still function normally when it is in a high temperature and high humidity environment for a long time.

The foregoing embodiments are merely intended to help persons of ordinary skill in the art to understand the technical solutions of the present disclosure, and are not intended to limit the present disclosure. Within the spirit and principles of the present disclosure, any modifications, equivalent substitutions, improvements, etc., are within the scope of protection of the present disclosure.

What is claimed is:

1. A display panel, comprising:
a first substrate;
a second substrate, opposite to the first substrate; and
a sealant, between the first substrate and the second substrate,
wherein a first waterproof layer is between the first substrate and the sealant; and the first waterproof layer is formed by a reaction between photopolymerizable monomer and siloxane under light, wherein the siloxane has a molecular structure shown in Formula (I):

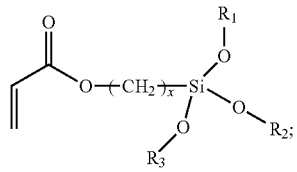
(I)

wherein x≥1, $R_1$, $R_2$ and $R_3$ are alkyl groups.

2. The display panel according to claim 1, wherein x is an integer from 1 to 20, and $R_1$, $R_2$, and $R_3$ are alkyl groups having 20 or less carbon atoms.

3. The display panel according to claim 2, wherein the siloxane has a molecular structure shown in Formula (II):

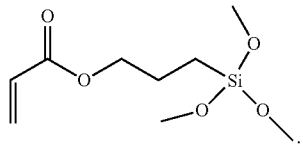
(II)

4. The display panel according to claim 1, wherein the photopolymerizable monomer has a molecular structure shown in Formula (III):

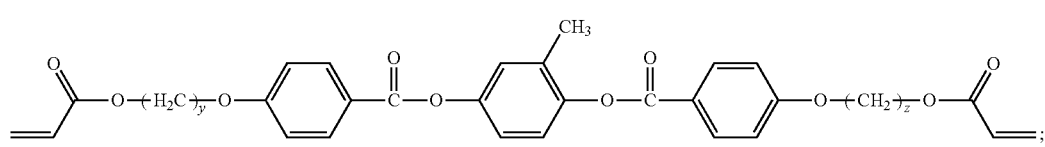
(III)

wherein y≥1 and z≥1.

5. The display panel according to claim 4, wherein y is an integer from 1 to 20, and z is an integer from 1 to 20.

6. The display panel according to claim 5, wherein the photopolymerizable monomer has a molecular structure shown in Formula (IV):

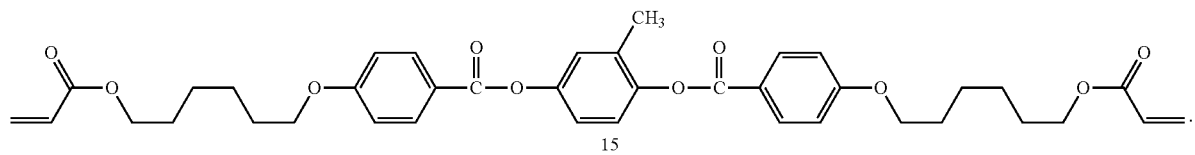
(IV)

7. A method for manufacturing a display panel, comprising:
forming a solution of siloxane onto a sealant coating area of a first substrate,
heating the first substrate to remove solvent in the solution of the siloxane;
coating a mixture of the photopolymerizable monomer and the sealant onto the sealant coating area of the first substrate; and
assembling the first substrate coated with the mixture of the photopolymerizable monomer and the sealant and the second substrate onto which liquid crystal is dropped, and curing the sealant by lighting and heating to obtain the display panel;
wherein the siloxane has a molecular structure shown in Formula (I):

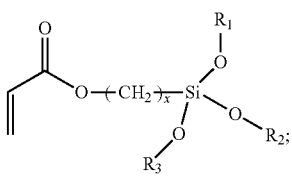
(I)

wherein x≥1, $R_1$, $R_2$ and $R_3$ are alkyl groups.

8. The manufacturing method according to claim 7, wherein x is an integer from 1 to 20, and $R_1$, $R_2$, and $R_3$ are alkyl groups having 20 or less carbon atoms.

9. The manufacturing method according to claim 8, wherein the siloxane has a molecular structure shown in Formula (II):

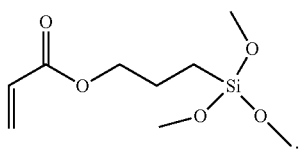
(II)

10. The manufacturing method according to claim 7, wherein the mass percentage of the siloxane is from 1% to 5% in the solution of the siloxane.

11. The manufacturing method according to claim 7, wherein the photopolymerizable monomer has a molecular structure shown in Formula (III):

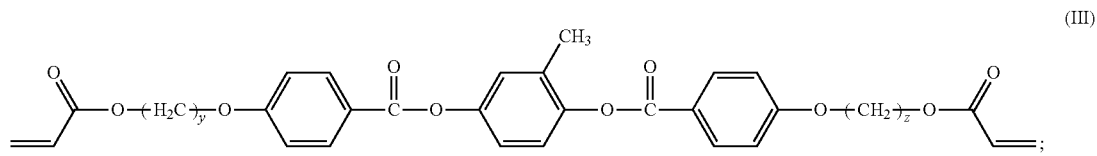

(III)

wherein y≥1 and z≥1.

12. The manufacturing method according to claim 11, wherein the photopolymerizable monomer has a molecular structure shown in Formula (IV):

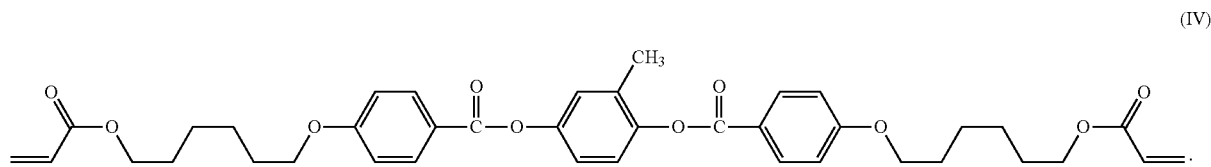 [SMILES: C=CC(=O)OCCCCCCOc1ccc(C(=O)Oc2ccc(OC(=O)c3ccc(OCCCCCCOC(=O)C=C)cc3)c(C)c2)cc1]

(IV)

13. The manufacturing method according to claim 7, wherein the mass percentage of the photopolymerizable monomer is from 3% to 10% in the mixture of the photopolymerizable monomer and the sealant.

14. The manufacturing method according to claim 7, wherein the heating the first substrate to remove the solvent in the solution of the siloxane, comprises:

heating the first substrate at 80° C. to 120° C. for 0.5 to 2 hours.

15. The manufacturing method according to claim 7, wherein the method for preparing the mixture of the photopolymerizable monomer and the sealant comprises: uniformly mixing the photopolymerizable monomer and the sealant, and defoaming under darkness.

16. The display panel according to claim 1, wherein a second waterproof layer is between the second substrate and the sealant.

\* \* \* \* \*